(12) United States Patent
Craig et al.

(10) Patent No.: US 7,677,879 B1
(45) Date of Patent: Mar. 16, 2010

(54) APPARATUS FOR DOCKING DOUGH

(75) Inventors: Todd W. Craig, Frisco, TX (US);
Stephen D. Voels, Frisco, TX (US);
Maria V. Brister, Corinth, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 12/177,569

(22) Filed: Jul. 22, 2008

(51) Int. Cl.
*A21C 11/12* (2006.01)

(52) U.S. Cl. .................... 425/290; 30/305; 30/358

(58) Field of Classification Search .......... 425/87, 425/290, 385; 426/391; 99/537; 30/305, 30/358
See application file for complete search history.

(56) References Cited

U.S. PATENT DOCUMENTS

| | | | |
|---|---|---|---|
| 1,026,436 A | | 5/1912 | Gregg |
| 1,170,772 A | | 2/1916 | Mitchel |
| 1,699,970 A | | 1/1929 | Jacques |
| 2,791,029 A | * | 5/1957 | Henneberger ............ 30/305 |
| 3,138,823 A | | 6/1964 | Langner |
| 3,414,925 A | | 12/1968 | Stavros |
| 3,669,069 A | * | 6/1972 | Bourboulis ............ 118/102 |
| D235,304 S | | 6/1975 | Greenberg |
| 3,891,494 A | | 6/1975 | Hunter |
| 3,949,660 A | | 4/1976 | Kuhlman |
| D252,126 S | | 6/1979 | Durant |
| D252,180 S | | 6/1979 | Zuber |
| 4,274,202 A | | 6/1981 | Petrick |
| 4,524,713 A | | 6/1985 | Debry |
| D312,950 S | | 12/1990 | Bell |
| D326,562 S | | 6/1992 | Bertwell |
| 5,244,374 A | * | 9/1993 | Gardner ............ 425/290 |
| D344,213 S | | 2/1994 | Johns |
| 5,591,470 A | | 1/1997 | Bartley |
| 6,194,017 B1 | | 2/2001 | Woodward et al. |
| 6,223,651 B1 | | 5/2001 | Campbell |
| 6,227,093 B1 | | 5/2001 | Rensky, Jr. |
| 6,267,036 B1 | | 7/2001 | Lani |
| 6,311,399 B1 | | 11/2001 | Steelman et al. |
| D481,268 S | | 10/2003 | Hibbert et al. |
| 2003/0051611 A1 | * | 3/2003 | Reddy ............ 99/537 |
| 2008/0028951 A1 | * | 2/2008 | Margaret ............ 99/537 |

FOREIGN PATENT DOCUMENTS

WO  9745020  12/1997

OTHER PUBLICATIONS

Doughpro, "PIZZAPRO Bubble Stopper™", product spec sheet, available at http://www.doughpro.com/product/spec_sheet/19/Bubble_Stopper.pdf.

* cited by examiner

*Primary Examiner*—Maria Veronica D Ewald
(74) *Attorney, Agent, or Firm*—Stites & Harbison, PLLC; David W. Nagle, Jr.

(57) ABSTRACT

An apparatus for docking dough includes a base member, a plurality of protrusions extending from a lower surface of the base member, and a handle secured to an upper surface of the base member. The base member is not flat, but rather has a curvature that enables the apparatus to be rocked from side to side when placed on a surface. Thus, in use, the apparatus is first placed on and manually pressed into a dough, such as an uncooked pizza dough. Then, the apparatus is rocked from side to side by the user to dock the dough, ensuring that dimples or divots are made throughout the dough.

13 Claims, 4 Drawing Sheets

APPARATUS FOR DOCKING DOUGH

BACKGROUND OF THE INVENTION

The present invention relates to devices and apparatus for docking dough, and, more particularly, to an apparatus that is manually pressed into and docks an uncooked pizza dough.

In baking, uncooked dough often undergoes a "docking" process, where the uncooked dough is perforated or pierced to create dimples or divots that allow steam to escape, preventing large bubbles or blisters from forming during baking. Not only are such large bubbles or blisters unsightly, but they also are susceptible to burning during baking. Thus, docking the dough significantly helps control the formation of blisters or bubbles, such that rather than having large blisters or bubbles on the surface of the dough, a thoroughly docked dough will have only smaller, more controlled blisters or bubbles.

In baking a pizza, the issue of such large bubbles or blisters has been long recognized, and in order to provide a pizza with a consistent appearance and quality, an uncooked pizza dough is often subject to some form of docking. Accordingly, various devices and apparatus have been developed for docking, from a simple fork to "bubble poppers" and "dough dockers." For example, U.S. Pat. No. 6,227,093 (Rensky) describes various known docking devices for an uncooked pizza dough, including a rolling docking device and a perforating tool. However, such prior art devices and tools often have a tendency to tear the uncooked dough, especially when used with smaller diameter doughs (i.e., less than six inches). Furthermore, such prior art devices may be time-consuming and/or lead to inconsistent results. Thus, there remains a need for an apparatus for docking dough that minimizes any unwanted "damage" to the dough, reduces docking time, and substantially eliminates docking mistakes.

SUMMARY OF THE INVENTION

The present invention is an apparatus for docking dough, such as an uncooked pizza dough. An exemplary apparatus for docking dough includes a base member, a plurality of protrusions extending from a lower surface of the base member, and a handle secured to an upper surface of the base member. The base member is not flat, but rather has a curvature that enables the apparatus to be rocked from side to side when placed on a surface.

In one exemplary embodiment, the protrusions are integral with the base member, with each protrusion having a frustoconical shape with a substantially flat distal end. The protrusions are arranged in concentric rings about the center of the base member, with each protrusion spaced approximately equidistant from neighboring protrusions.

The handle is secured to and extends from an upper surface of the base member. The handle allows a user to grasp and control the apparatus, manipulating the protrusions into engagement with the dough. Since the base member is not flat, but rather has a curvature that enables the apparatus to be rocked from side to side when placed on a surface, a portion of the protrusions are raised off the underlying surface. Thus, in use, the apparatus is first placed on and manually pressed into a dough, such as an uncooked pizza dough. Then, the apparatus is rocked from side to side by the user to dock the dough, ensuring that dimples or divots are made throughout the dough.

DETAILED DESCRIPTION OF THE INVENTION

Figure 1:
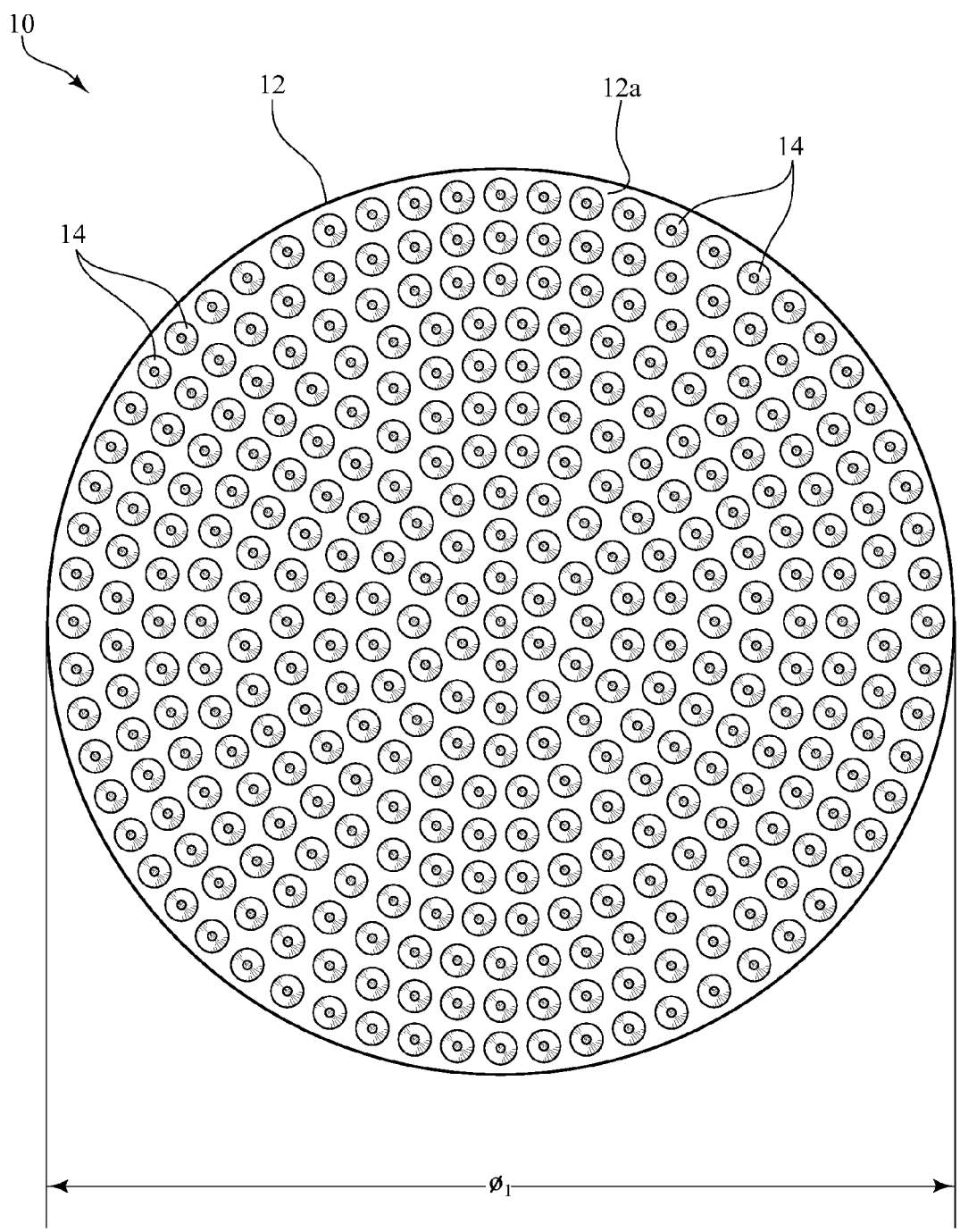
FIG. 1 is a bottom view of an exemplary apparatus for docking dough made in accordance with the present invention.

The present invention is an apparatus for docking dough, such as an uncooked pizza dough.

Referring to FIGS. 1-4, an exemplary apparatus 10 for docking dough made in accordance with the present invention includes a base member 12, a plurality of protrusions (generally indicated by reference numeral 14) extending from a lower surface 12a of the base member 12, and a handle 16 secured to an upper surface 12b of the base member 12.

Figure 2:
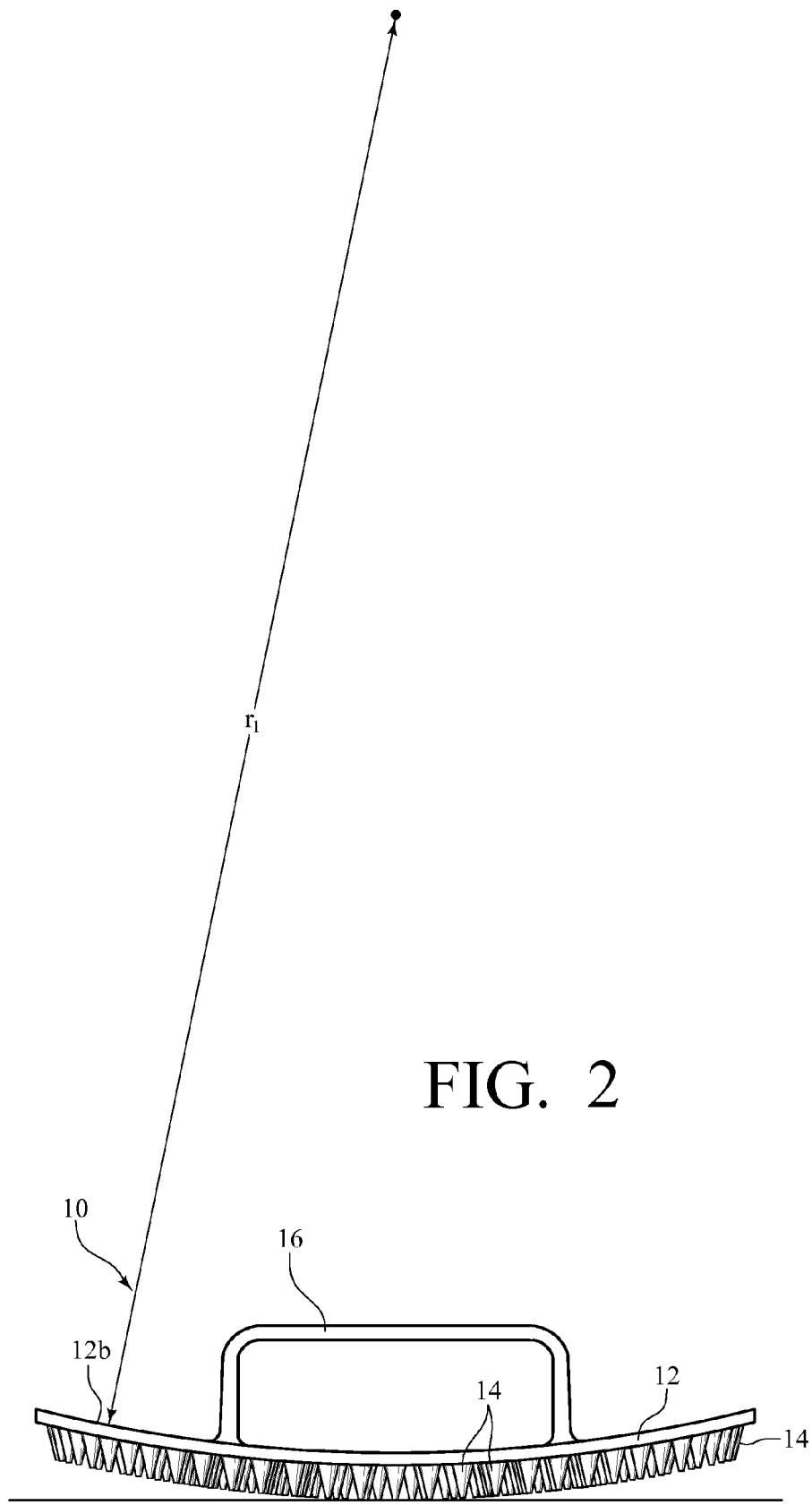
FIG. 2 is an end view of the exemplary apparatus for docking dough of FIG. 1.

As best shown in FIG. 1, in this exemplary embodiment, the base member 12 has a generally circular shape. Thus, the base member 12 is shaped to match the shape of an uncooked pizza dough with a corresponding circular shape. That being said, the base member 12 could be square, rectangular, or another shape without departing from the spirit or scope of the present invention. However, and as best shown in FIG. 2, the base member 12 is not flat, but rather has a curvature that enables the apparatus 10 to be rocked from side to side when placed on a surface, the importance of which is further described below. In this exemplary embodiment, the base member 12 has a diameter, $\varnothing_1$, of approximately eight inches, and is designed for use with a nine-inch pizza dough. Of course, base members having other diameters, whether larger or smaller, could be manufactured for use with dough of differing sizes without departing from the spirit or scope of the present invention.

Figure 4:
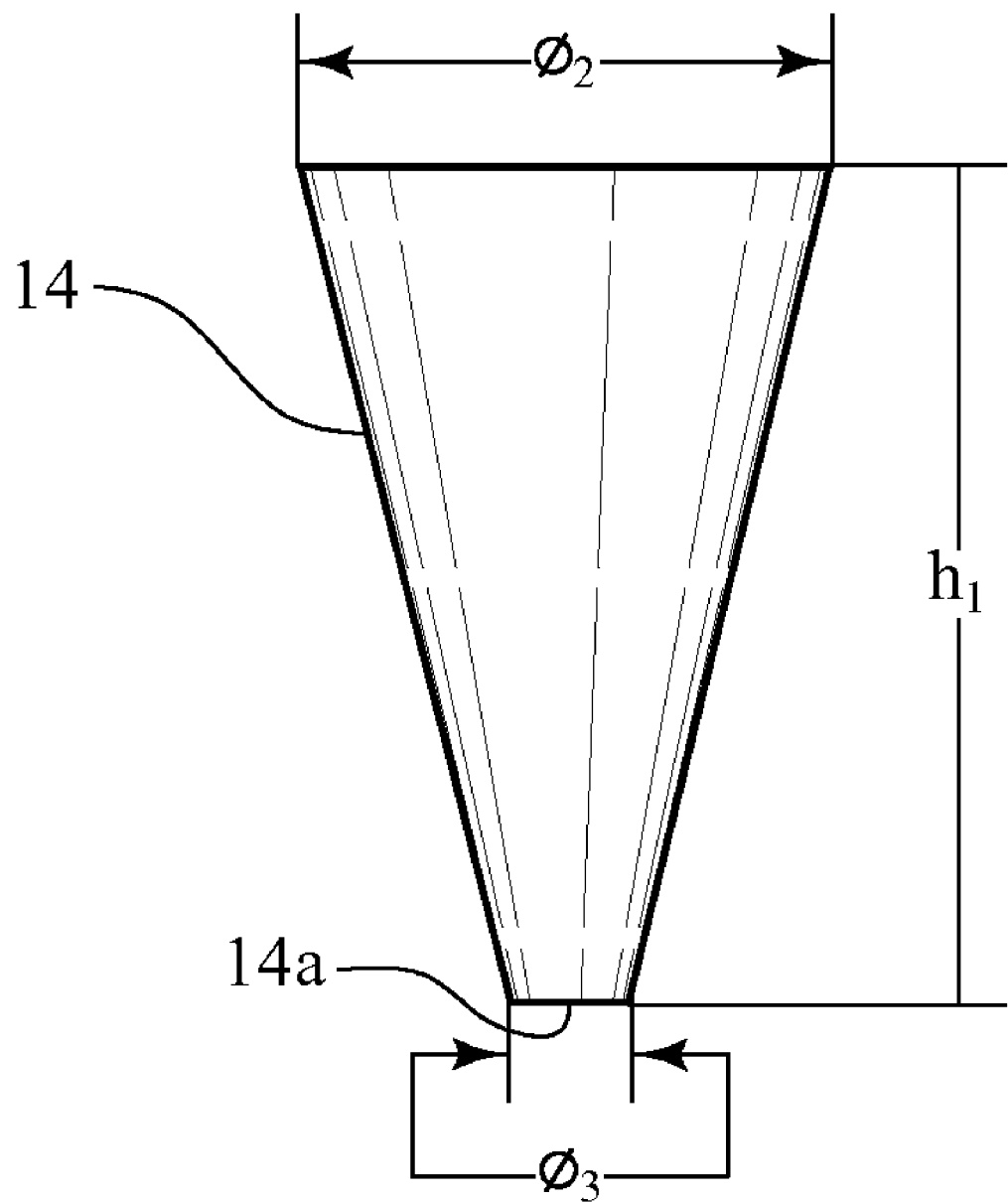
FIG. 4 is a side view of one protrusion of the exemplary apparatus for docking dough of FIG. 1.

In this exemplary embodiment, the protrusions 14 are integral with and extend from the lower surface 12a of the base member 12. Furthermore, in this exemplary embodiment and as best shown in FIG. 4, each of the protrusions 14 has a frustoconical shape, with a substantially flat distal end 14a. The base of each protrusion 14 has a diameter, $\varnothing_2$, of approximately 0.25", while the distal end 14a has a diameter, $\varnothing_3$, of approximately 0.0625". Finally, in this exemplary embodiment, each protrusion 14 has a height, $h_1$, of approximately 0.50".

Referring again to FIG. 1, in this exemplary embodiment, the protrusions 14 are arranged in concentric rings about the center of the base member 12, with each protrusion 14 spaced approximately equidistant from neighboring protrusions 14. The pattern, spacing, and number of the protrusions 14 create a sufficient number of dimples or divots in the dough to control the formation of blisters or bubbles. Of course, various other patterns and spacing could also be utilized without departing from the spirit or scope of the present invention.

Figure 3:
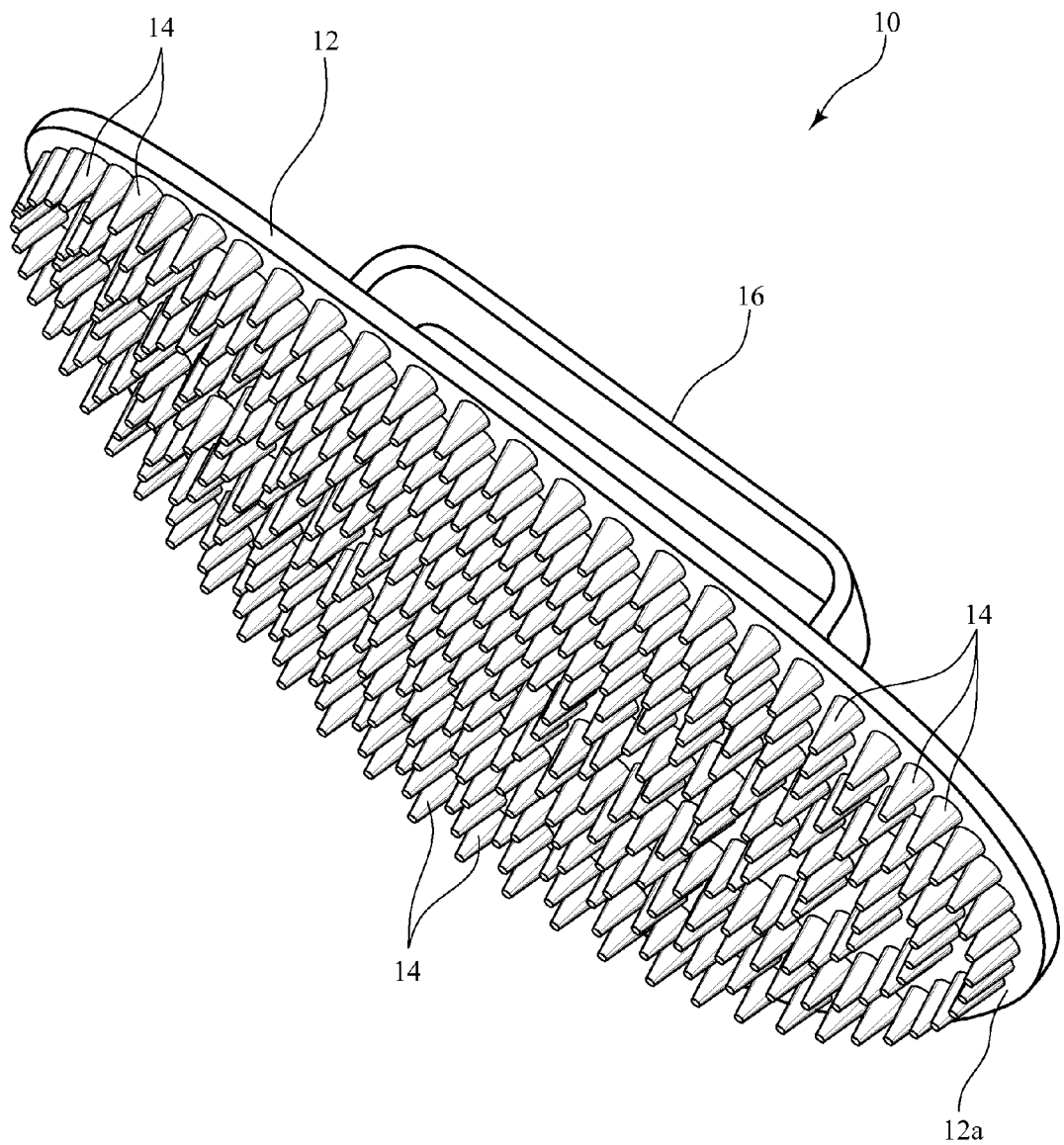
FIG. 3 is a perspective view of the exemplary apparatus for docking dough of FIG. 1.

Referring now to FIGS. 2-3, the handle 16 is secured to and extends from an upper surface 12b of the base member 12. In this exemplary embodiment, the handle 16 is also integral with the base member 12, as the apparatus 10 has a unitary construction and is preferably formed as part of an injection molding or similar manufacturing process. In any event, the handle 16 allows a user to grasp and control the apparatus 10, manipulating the protrusions 14 into engagement with the dough, as is further described below.

As mentioned above, the base member 12 is not flat, but rather has a curvature that enables the apparatus 10 to be rocked from side to side when placed on a surface. In this exemplary embodiment, and as best shown in FIG. 2, the base member 12 curves upwardly with a radius of curvature, $r_1$, of approximately 16.25". In other words, in this exemplary embodiment, the radius of curvature, $r_1$, is approximately twice the diameter, $\varnothing_i$, of the base member 12. As a result, a portion of the protrusions 14 are raised off the underlying surface due to the curvature of the base member 12. Thus, in use, the apparatus 10 is first placed on and manually pressed into a dough, such as an uncooked pizza dough. Then, the apparatus 10 is rocked from side to side by the user to dock the dough, ensuring that dimples or divots are made throughout the dough.

By using such an apparatus 10, docking can be accomplished rapidly and efficiently, and without tearing or other unwanted "damage" to the dough. Furthermore, docking is consistent. For instance, in baking multiple pizzas in a restaurant, each and every pizza will be docked in substantially the same manner, with little chance for errors or mistakes.

One of ordinary skill in the art will recognize that additional embodiments are possible without departing from the teachings of the present invention or the scope of the claims which follow. This detailed description, and particularly the specific details of the exemplary embodiment disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. An apparatus for docking dough, comprising:
   a base member defining an upper surface and a lower surface, said base member further having a curvature;
   a plurality of protrusions extending from the lower surface of said base member for engaging the dough, wherein each of the protrusions has a substantially frustoconical shape; and
   a handle extending from the upper surface of said base member;
   wherein the protrusions extending from the lower surface of the apparatus can be pressed into the dough, with the curvature of said base member allowing the apparatus to be rocked from side to side such that said plurality of protrusions dock the dough; and
   wherein said base member has a diameter, and said base member curves upwardly with a radius of curvature of approximately twice the diameter of the base member.

2. The apparatus as recited in claim 1, wherein said base member curves upwardly with a radius of curvature of approximately 16.25".

3. An apparatus for docking dough, comprising:
   a base member defining an upper surface and a lower surface, said base member further having a curvature;
   a plurality of integral protrusions extending from the lower surface of said base member for engaging the dough, wherein each of the protrusions has a substantially frustoconical shape; and
   an integral handle extending from the upper surface of said base member;
   wherein said integral handle can be grasped by a user for manipulating the protrusions into engagement with the dough, with the curvature of said base member then allowing the user to rock the apparatus from side to side such that said plurality of protrusions dock the dough; and
   wherein said base member has a diameter, and said base member curves upwardly with a radius of curvature of approximately twice the diameter of the base member.

4. The apparatus as recited in claim 1, wherein said base member has a generally circular shape, such that the apparatus can be used for docking an uncooked pizza dough with a corresponding circular shape.

5. The apparatus as recited in claim 1, wherein the protrusions are arranged in concentric rings about a center of the base member, with each protrusion spaced approximately equidistant from neighboring protrusions.

6. The apparatus as recited in claim 3, wherein said base member has a generally circular shape, such that the apparatus can be used for docking an uncooked pizza dough with a corresponding circular shape.

7. The apparatus as recited in claim 3, wherein the protrusions are arranged in concentric rings about a center of the base member, with each protrusion spaced approximately equidistant from neighboring protrusions.

8. The apparatus as recited in claim 1, wherein the protrusions are integral with said base member.

9. The apparatus as recited in claim 1, wherein said handle is integral with said base member.

10. The apparatus as recited in claim 1, wherein each of the protrusions has a substantially flat distal end.

11. The apparatus as recited in claim 10, wherein a base of each protrusion has a diameter of approximately 0.25", while the distal end has a diameter of approximately 0.0625".

12. The apparatus as recited in claim 11, wherein each protrusion has a height of approximately 0.50".

13. The apparatus as recited in claim 1, wherein each protrusion has a height of approximately 0.50".

* * * * *